US010152938B2

(12) United States Patent
Lee et al.

(10) Patent No.: US 10,152,938 B2
(45) Date of Patent: Dec. 11, 2018

(54) METHOD OF DRIVING DISPLAY PANEL, TIMING CONTROLLER FOR PERFORMING THE SAME AND DISPLAY APPARATUS HAVING THE TIMING CONTROLLER

(71) Applicant: Samsung Display Co., Ltd., Yongin-si, Gyeonggi-do (KR)

(72) Inventors: Chang-Soo Lee, Suwon-si (KR); Hoi-Sik Moon, Asan-si (KR); Gwang-Ho Nam, Asan-si (KR); Min-Yup Chae, Cheonan-si (KR); Hak-Mo Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 116 days.

(21) Appl. No.: 14/987,094

(22) Filed: Jan. 4, 2016

(65) Prior Publication Data

US 2016/0196797 A1 Jul. 7, 2016

(30) Foreign Application Priority Data

Jan. 5, 2015 (KR) ........................ 10-2015-0000788

(51) Int. Cl.
*G06F 3/038* (2013.01)
*G09G 3/36* (2006.01)

(52) U.S. Cl.
CPC ... *G09G 3/3666* (2013.01); *G09G 2320/0261* (2013.01); *G09G 2320/106* (2013.01); *G09G 2340/0435* (2013.01); *G09G 2340/16* (2013.01)

(58) Field of Classification Search
CPC combination set(s) only.
See application file for complete search history.

(56) References Cited

U.S. PATENT DOCUMENTS

2001/0052888 A1* 12/2001 Hebiguchi ........... G09G 3/3666 345/87
2002/0015104 A1* 2/2002 Itoh .......................... G09G 3/20 348/459

(Continued)

FOREIGN PATENT DOCUMENTS

KR 10-2000-0060831 10/2000
KR 10-2005-0014134 2/2005

(Continued)

*Primary Examiner* — Temesghen Ghebretinsae
*Assistant Examiner* — Sosina Abebe
(74) *Attorney, Agent, or Firm* — H.C. Park & Associates, PLC

(57) ABSTRACT

A display panel is divided into multiple areas respectively driven by multiple drivers, and the multiple areas are adjacent to each other along a first direction. An object moves along the first direction between a first frame and a second frame and is displayed on the display panel. The moving speed of the object is compared with a reference speed. A main compensation frame is added between the first frame and the second frame. A first high speed compensation frame is added between the first frame and the main compensation frame when the moving speed is higher than or equal to the reference speed. A first low speed compensation frame is added between the first frame and the main compensation frame when the moving speed is lower than the reference speed, and the first low speed compensation frame is different from the first high speed compensation frame.

19 Claims, 8 Drawing Sheets

200

(56) References Cited

U.S. PATENT DOCUMENTS

2009/0231314 A1* 9/2009 Hanaoka .............. G09G 3/2096 345/208
2010/0149148 A1* 6/2010 Choe ........................ G09G 3/20 345/208
2010/0265272 A1* 10/2010 Bae ...................... G09G 3/2003 345/690
2015/0243232 A1* 8/2015 Kim ..................... G09G 3/3648 345/214

FOREIGN PATENT DOCUMENTS

KR 10-2006-0077364 7/2006
KR 10-2014-0033951 3/2014

* cited by examiner

METHOD OF DRIVING DISPLAY PANEL, TIMING CONTROLLER FOR PERFORMING THE SAME AND DISPLAY APPARATUS HAVING THE TIMING CONTROLLER

CLAIM OF PRIORITY

This application makes reference to, incorporates the same herein, and claims all benefits accruing under 35 U.S.C. § 119 from an application earlier filed in the Korean Intellectual Property Office on 5 Jan. 2015 and there duly assigned Serial No. 10-2015-0000788.

BACKGROUND OF THE INVENTION

1. Field of the Invention

Exemplary embodiments of the present inventive concept relate to a display device, and more particularly to a method of driving a display panel, a timing controller for performing the method and a display apparatus having the timing controller.

2. Description of the Related Art

A display apparatus such as a liquid crystal display apparatus includes a display panel and a driving circuit configured to drive the display panel. The driving circuit includes a gate driving part, a data driving part and a timing controlling part.

Generally, the display apparatus includes one driving apparatus. However, as the size and the operating speed of the display panel have increased, a charging rate for each pixel may be degraded in the display apparatus including one driving circuit.

To improve the charging rate, a display apparatus of a panel dividing type has been developed. In the display apparatus of the panel dividing type, a display panel is divided into at least two divided panel portion, and each divided panel portion is driven by a respective driving circuit. The display apparatus of the panel dividing type includes a plurality of driving circuit. The display apparatus of the panel dividing type may have an improved charging rate.

However, when a frame rate is increased in the panel dividing type, artifacts are caused because each divided panel portion is driven by the respective driving circuit.

The above information disclosed in this Background section is only for enhancement of understanding of the background of the inventive concept, and, therefore, it may contain information that does not form the prior art that is already known in this country to a person of ordinary skill in the art.

SUMMARY OF THE INVENTION

Exemplary embodiments of the present inventive concept provide a method of driving a display panel capable of improving the quality of display.

Exemplary embodiments of the present inventive concept provide a timing controller for performing the method.

Exemplary embodiments of the present inventive concept provide a display apparatus having the timing controller.

An exemplary embodiment of the present inventive concept provides a method of driving a display panel divided into a first area driven by a first driver and a second area driven by a second driver, and the second area is adjacent to the first area along a first direction. According to the method, a moving speed of an object is measured, and the object moves along the first direction between a first frame and a second frame and is displayed on the display panel. The moving speed is compared with a reference speed. A main compensation frame is added between the first frame and the second frame. A first high speed compensation frame is added between the first frame and the main compensation frame when the moving speed is higher than or equal to the reference speed. A first low speed compensation frame is added between the first frame and the main compensation frame when the moving speed is lower than the reference speed, and the first low speed compensation frame is different from the first high speed compensation frame.

In an exemplary embodiment, data corresponding to the first high speed compensation frame may be generated based on data corresponding to the first frame and data corresponding to the main compensation frame.

In an exemplary embodiment, the data corresponding to the first high speed compensation frame may be closer to one of the data corresponding to the first frame and the data corresponding to the main compensation frame than to the other.

In an exemplary embodiment, the data corresponding to the first low speed compensation frame may be generated by a Motion Estimation Motion Compensation (MEMC) scheme based on data corresponding to the first frame and data corresponding to the second frame.

In an exemplary embodiment, a second high speed compensation frame may be added between the main compensation frame and the second frame when the moving speed is higher than or equal to the reference speed. A second low speed compensation frame may be added between the main compensation frame and the second frame when the moving speed is lower than the reference speed, and the second low speed compensation frame is different from the second high speed compensation frame.

In an exemplary embodiment, data corresponding to the second high speed compensation frame may be generated based on data corresponding to the main compensation frame and data corresponding to the second frame.

In an exemplary embodiment, the data corresponding to the second high speed compensation frame may be closer to one of the data corresponding to the main compensation frame and the data corresponding to the second frame than to the other.

In an exemplary embodiment, the first direction may be substantially parallel with a shorter side of the display panel.

In an exemplary embodiment, a viewer may be able to set the reference speed.

A timing controller according to an exemplary embodiment of the present inventive concept includes a speed measuring part, a speed comparing part, a main compensation part, a compensation part and a signal generator. The speed measuring part is configured to measure a moving speed of an object moving along a first direction between a first frame and a second frame based on an input signal. The speed comparing part is configured to compare the moving speed with a reference speed. The main compensation part is configured to add a main compensation frame between the first frame and the second frame. The compensation part is configured to add a first high speed compensation frame between the first frame and the main compensation frame when the moving speed is higher than or equal to the reference speed, and is configured to add a first low speed compensation frame between the first frame and the main compensation frame when the moving speed is lower than the reference speed, the first low speed compensation frame being different from the first high speed compensation frame. The signal generator is configured to output signals for driving a display panel based on images of the first frame, the first high speed compensation frame, the first low speed compensation frame, the main compensation frame and the second frame.

In an exemplary embodiment, the compensation part may be configured to generate data corresponding to the first high speed compensation frame based on data corresponding to the first frame and data corresponding to the main compensation frame.

In an exemplary embodiment, the data corresponding to the first high speed compensation frame may be closer to one of the data corresponding to the first frame and the data corresponding to the main compensation frame than to the other.

In an exemplary embodiment, the compensation part may be configured to add a second high speed compensation frame between the main compensation frame and the second frame when the moving speed is higher than or equal to the reference speed, and may be configured to add a second low speed compensation frame between the main compensation frame and the second frame when the moving speed is lower than the reference speed, the second low speed compensation frame being different from the second high speed compensation frame.

In an exemplary embodiment, the first direction may be a shorter side direction of the display panel.

A display apparatus according to an exemplary embodiment of the present inventive concept includes a display panel, a timing controller, an upper gate driver, a lower gate driver, an upper data driver and a lower data driver. The display panel is divided into a first area and a second area adjacent to the first area along a first direction, and is configured to display an image. The timing controller includes a speed measuring part, a speed comparing part, a main compensation part, a compensation part and a signal generator. The speed measuring part is configured to measure a moving speed of an object moving along a first direction between a first frame and a second frame based on an input signal. The speed comparing part is configured to compare the moving speed with a reference speed. The main compensation part is configured to add a main compensation frame between the first frame and the second frame. The compensation part is configured to add a first high speed compensation frame between the first frame and the main compensation frame when the moving speed is higher than or equal to the reference speed, and is configured to add a first low speed compensation frame between the first frame and the main compensation frame when the moving speed is lower than the reference speed, the first low speed compensation frame being different from the first high speed compensation frame. The signal generator is configured to output signals for driving a display panel based on images of the first frame, the first high speed compensation frame, the first low speed compensation frame, the main compensation frame and the second frame. The upper gate driver is configured to output an upper gate signal to the first area based on the first upper control signal. The lower gate driver is configured to output a lower gate signal to the second area based on the first lower control signal. The upper data driver is configured to output an upper data voltage to the first area based on the second upper control signal and the upper data signal. The lower data driver is configured to output a lower data voltage to the second area based on the second lower control signal and the lower data signal.

In an exemplary embodiment, the compensation part may be configured to generate data corresponding to the first high speed compensation frame based on data corresponding to the first frame and data corresponding to the main compensation frame.

In an exemplary embodiment, the data corresponding to the first high speed compensation frame may be closer to one of the data corresponding to the first frame and the data corresponding to the main compensation frame than to the other.

According to the method of driving the display panel and the display apparatus for performing the method, when a speed of an object moving between each divided area of the display panel is higher than or equal to a reference speed, a method of frame compensation is changed to improve the quality of display.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF EMBODIMENTS

Hereinafter, the present inventive concept will be explained in detail with reference to the accompanying drawings.

Figure 1:
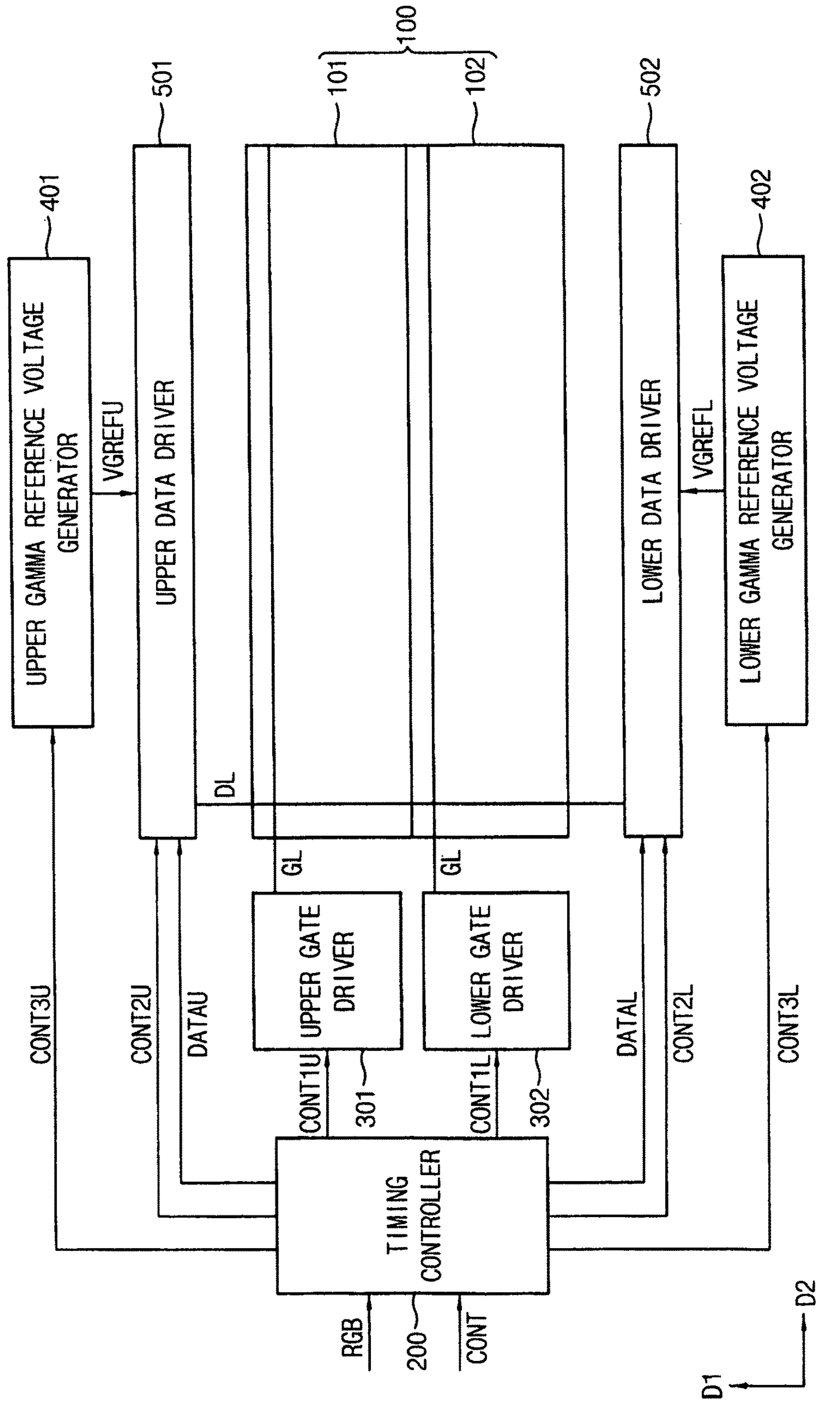
FIG. 1 is a block diagram illustrating a display apparatus according to exemplary embodiments.

FIG. 1 is a block diagram illustrating a display apparatus according to exemplary embodiments.

In reference to FIG. 1, the display apparatus includes a display panel 100 and a panel driver. The panel driver includes a timing controller 200, an upper gate driver 301, a lower gate driver 302, an upper gamma reference voltage generator 401, a lower gamma reference voltage generator 402, an upper data driver 501 and a lower data driver 502.

The display panel 100 is divided into a first area 101 and a second area 102. The first area 101 may be adjacent to the second area 102 along a first direction D1. The display panel 100 includes a display region for displaying an image and a peripheral region adjacent to the display region. The first direction D1 is substantially parallel with a shorter side of the display panel.

The first area 101 and the second area 102 of the display panel 100 include a plurality of gate lines GL, a plurality of data lines DL and a plurality of pixels connected to the gate lines GL and the data lines DL. The data lines DL extend in the first direction D1 and the gate lines GL extend in a second direction D2 crossing the first direction D1.

The display panel 100 displays an image. The image may include a first frame. The image may further include a second frame.

In some exemplary embodiments, the pixels include a switching element (not shown), a liquid crystal capacitor (not shown) and a storage capacitor (not shown). The liquid crystal capacitor and the storage capacitor are electrically connected to the switching element. The pixels may be arranged in a matrix configuration.

The timing controller 200 receives input image data RGB and an input control signal CONT from an external device (not shown). The input image data RGB may include red image data R, green image data G and blue image data B. The input control signal CONT may include a master clock signal and a data enable signal. The input control signal CONT may further include a vertical synchronizing signal and a horizontal synchronizing signal.

The timing controller 200 generates a first upper control signal CONT1U, a second upper control signal CONT2U, a third upper control signal CONT3U, an upper data signal DATAU, a first lower control signal CONT1L, a second lower control signal CONT2L, a third lower control signal CONT3L and a lower data signal DATAL based on the input image data RGB and the input control signal CONT.

The timing controller 200 generates the first upper control signal CONT1U for controlling operations of the upper gate driver 301 based on the input control signal CONT, and outputs the first upper control signal CONT1U to the upper gate driver 301. The first upper control signal CONT1U may include a vertical start signal and a gate clock signal.

The timing controller 200 generates the upper second control signal CONT2U for controlling operations of the upper data driver 501 based on the input control signal CONT, and outputs the upper second control signal CONT2U to the upper data driver 501. The second upper control signal CONT2U may include a horizontal start signal and a load signal.

The timing controller 200 generates the upper data signal DATAU based on the input image data RGB. The timing controller 200 outputs the upper data signal DATAU to the upper data driver 501.

The timing controller 200 generates the third upper control signal CONT3U for controlling operations of the upper gamma reference voltage generator 401 based on the input control signal CONT, and outputs the third upper control signal CONT3U to the upper gamma reference voltage generator 401.

The timing controller 200 generates the first lower control signal CONT1L for controlling operations of the lower gate driver 302 based on the input control signal CONT, and outputs the first lower control signal CONT1L to the lower gate driver 302. The first lower control signal CONT1L may include a vertical start signal and a gate clock signal.

The timing controller 200 generates the lower second control signal CONT2L for controlling operations of the lower data driver 502 based on the input control signal CONT, and outputs the lower second control signal CONT2L to the lower data driver 502. The second lower control signal CONT2L may include a horizontal start signal and a load signal.

The timing controller 200 generates the lower data signal DATAL based on the input image data RGB. The timing controller 200 outputs the lower data signal DATAL to the lower data driver 502.

The timing controller 200 generates the third lower control signal CONT3L for controlling operations of the lower gamma reference voltage generator 402 based on the input control signal CONT, and outputs the third lower control signal CONT3L to the lower gamma reference voltage generator 402.

The operations of the timing controller 200 will be explained in detail with reference to FIG. 2.

The upper gate driver 301 generates upper gate signals for driving the gate lines GL in response to the first upper control signal CONT1U received from the timing controller 200. The upper gate driver 301 sequentially outputs the upper gate signals to the gate lines GL.

In some exemplary embodiments, the upper gate driver 301 may be directly mounted on the display panel 100, or may be connected to the display panel 100 as a tape carrier package (TCP) type. Alternatively, the upper gate driver 301 may be integrated on the peripheral region of the display panel 100.

The upper gamma reference voltage generator 401 generates an upper gamma reference voltage VGREFU in response to the third upper control signal CONT3U received from the timing controller 200. The upper gamma reference voltage generator 401 outputs the upper gamma reference voltage VGREFU to the data driver 501. The level of the upper gamma reference voltage VGREFU corresponds to grayscales of a plurality of pixel data included in the upper data signal DATAU.

In some exemplary embodiments, the upper gamma reference voltage generator 401 may be disposed in the timing controller 200, or may be disposed in the upper data driver 501.

The data driver 501 receives the upper second control signal CONT2U and the upper data signal DATAU from the timing controller 200, and receives the upper gamma reference voltage VGREFU from the upper gamma reference voltage generator 401. The upper data driver 501 converts the upper data signal DATAU to data voltages having analogue levels based on the upper gamma reference voltage VGREFU. The upper data driver 501 outputs the data voltages to the data lines DL.

In some exemplary embodiments, the upper data driver 501 may be directly mounted on the display panel 100, or may be connected to the display panel 100 as a tape carrier package (TCP) type. Alternatively, the upper data driver 501 may be integrated on the peripheral region of the display panel 100.

The lower gate driver 302 generates lower gate signals for driving the gate lines GL in response to the first lower control signal CONT1L received from the timing controller 200. The lower gate driver 302 sequentially outputs the lower gate signals to the gate lines GL.

In some exemplary embodiments, the lower gate driver 302 may be directly mounted on the display panel 100, or may be connected to the display panel 100 as a tape carrier package (TCP) type. Alternatively, the lower gate driver 302 may be integrated on the peripheral region of the display panel 100.

The lower gamma reference voltage generator 402 generates a lower gamma reference voltage VGREFL in response to the third lower control signal CONT3L received from the timing controller 200. The lower gamma reference voltage generator 402 outputs the lower gamma reference voltage VGREFL to the data driver 502. The level of the lower gamma reference voltage VGREFL corresponds to grayscales of a plurality of pixel data included in the lower data signal DATAL.

In some exemplary embodiments, the lower gamma reference voltage generator 402 may be disposed in the timing controller 200, or may be disposed in the lower data driver 502.

The data driver 502 receives the lower second control signal CONT2L and the lower data signal DATAL from the timing controller 200, and receives the lower gamma reference voltage VGREFL from the lower gamma reference voltage generator 402. The lower data driver 502 converts the lower data signal DATAL to data voltages having analogue levels based on the lower gamma reference voltage VGREFL. The lower data driver 502 outputs the data voltages to the data lines DL.

In some exemplary embodiments, the lower data driver 502 may be directly mounted on the display panel 100, or may be connected to the display panel 100 as a tape carrier package (TCP) type. Alternatively, the lower data driver 502 may be integrated on the peripheral region of the display panel 100.

Figure 2:
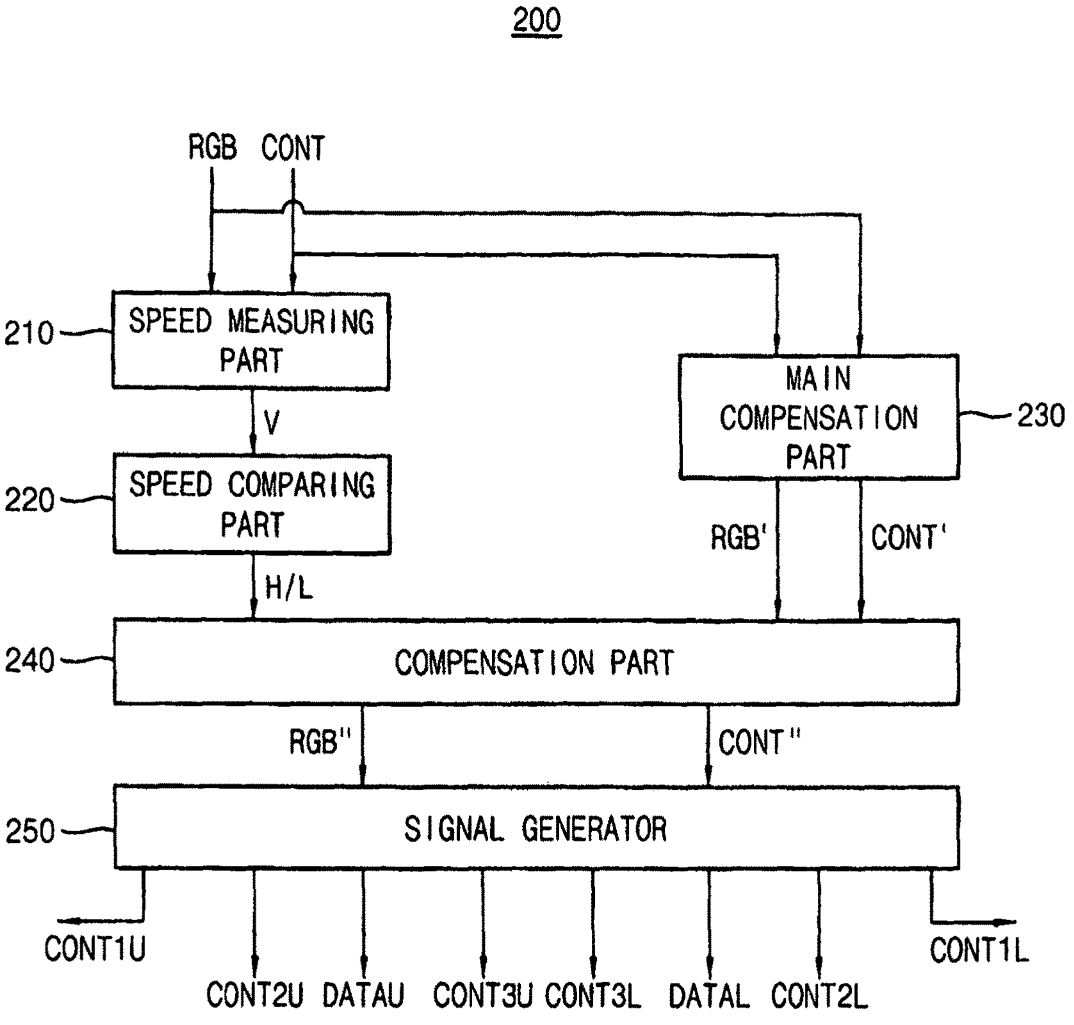
FIG. 2 is a block diagram illustrating a timing controller in FIG. 1.

FIG. 2 is a block diagram illustrating a timing controller in FIG. 1.

In reference to FIGS. 1 and 2, the timing controller 200 includes a speed measuring part 210, a speed comparing part 220, a main compensation part 230, a compensation part 240 and a signal generator 250.

The speed measuring part 210 measures a moving speed V of an object based on the input image data RGB and the input control signal CONT received from the external device (not shown). The moving speed V may be a speed of the object moving along the first direction D1. The speed measuring part 210 outputs the moving speed V to the speed comparing part 220.

The speed comparing part 220 compares the moving speed V received from the speed measuring part 210 with a reference speed. A viewer may be able to set the reference speed. The speed comparing part 220 outputs a high speed signal H to the compensation part 240 when the moving speed V is higher than or equal to the reference speed VR. The speed comparing part 220 outputs a low speed signal L to the compensation part 240 when the moving speed V is lower than the reference speed.

The main compensation part 230 may include a first frame rate controller (not shown). The main compensation part 230 may double a frame rate of received signals with the first frame rate controller. The main compensation part 230 generates main compensation input image data RGB' and a main compensation input control signal CONT' based on the input image data RGB and the input control signal CONT. The main compensation input image data RGB' and the main compensation input control signal CONT' include information about an image of a main compensation frame. The main compensation part 230 outputs the main compensation input image data RGB' and the main compensation input control signal CONT' to the compensation part 240. The operations of the main compensation part 230 generating the main compensation frame will be explained in detail with reference to FIG. 3.

The compensation part 240 may include a second frame rate controller (not shown). The compensation part 240 may double a frame rate of received signals with the second frame rate controller.

The compensation part 240 generates compensation input image data RGB" and a compensation input control signal CONT" based on the main compensation input image data RGB' and the main compensation input control signal CONT' when the high speed signal H is received from the speed comparing part 220. The compensation input image data RGB" and the compensation input control signal CONT" include information about an image of a first high speed compensation frame. The compensation input image data RGB" and the compensation input control signal CONT" may include information about an image of a second high speed compensation frame. The compensation part 240 outputs the compensation input image data RGB" and the compensation input control signal CONT" to the signal generator 250.

Alternatively, the compensation part 240 generates compensation input image data RGB" and a compensation input control signal CONT" based on the main compensation input image data RGB' and the main compensation input control signal CONT' when the low speed signal L is received from the speed comparing part 220. The compensation input image data RGB" and the compensation input control signal CONT" include information about an image of a first low speed compensation frame. The compensation input image data RGB" and the compensation input control signal CONT" may include information about an image of a second low speed compensation frame. The compensation part 240 outputs the compensation input image data RGB" and the compensation input control signal CONT" to the signal generator 250.

The operations of the compensation part 240 generating the first high speed compensation frame and the second high speed compensation frame will be explained in detail with reference to FIGS. 4A and 4B. The operations of the compensation part 240 generating the first low speed compensation frame and the second low speed compensation frame will be explained in detail with reference to FIGS. 5A and 5B.

The signal generator 250 generates the upper first control signal CONT1U, the second upper control signal CONT2U, the third upper control signal CONT3U, the upper data signal DATAU, the first lower control signal CONT1L, the second lower control signal CONT2L, the third lower control signal CONT3L and the lower data signal DATAL based on the compensation input image data RGB" and the compensation input control signal CONT". The signal generator 250 outputs the first upper control signal CONT1U to the upper gate driver 301. The signal generator 250 outputs the second upper control signal CONT2U and the upper data signal DATAU to the upper data driver 501. The signal generator 250 outputs the third upper control signal CONT3U to the upper gamma reference voltage generator 401. The signal generator 250 outputs the first lower control signal CONT1L to the lower gate driver 302. The signal generator 250 outputs the second lower control signal CONT2L and the lower data signal DATAL to the lower data driver 502. The signal generator 250 outputs the third lower control signal CONT3L to the lower gamma reference voltage generator 402.

Figure 3:
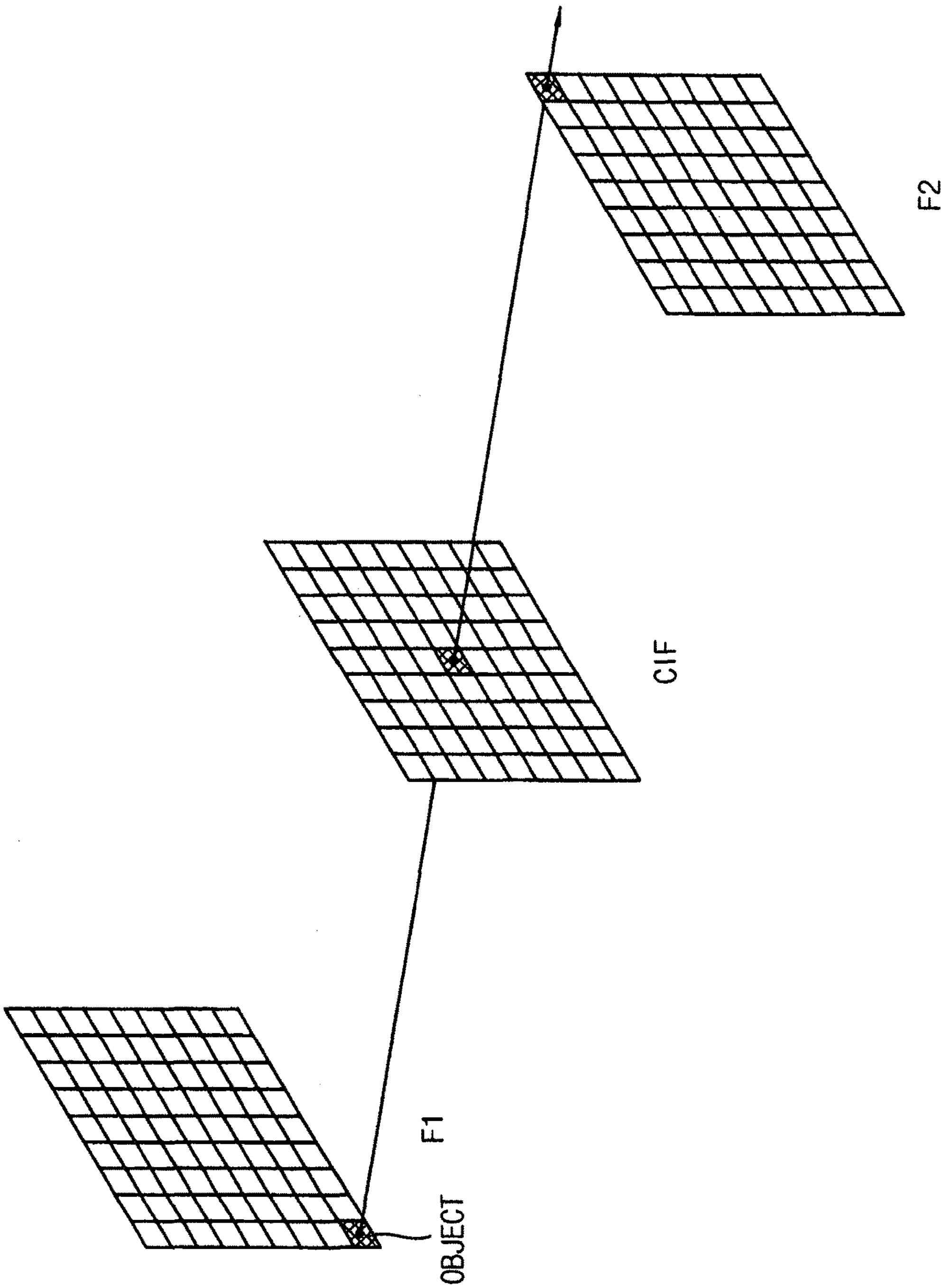
FIG. 3 is a diagram illustrating a method of generating a main compensation frame in a main compensation part in FIG. 2.

FIG. 3 is a diagram illustrating a method of generating a main compensation frame in a main compensation part in FIG. 2.

In reference to FIGS. 2 and 3, a frame rate of the input image data RGB and the input control signal CONT is n Hz. For example, the frame rate of the input image data RGB and the input control signal CONT may be about 60 Hz. The input image data RGB and the input control signal CONT include information about images of a first frame F1 and a second frame F2.

The main compensation part 230 may include the first frame rate controller. The main compensation part 230 may double a frame rate of received signals with the first frame rate controller. The main compensation part 230 generates the main compensation input image data RGB' and the main compensation input control signal CONT' based on the input image data RGB and the input control signal CONT. A frame rate of the main compensation input image data RGB' and the main compensation input control signal CONT' is 2 n Hz. For example, a frame rate of the main compensation input image data RGB' and the main compensation input control signal CONT' may be about 120 Hz. The main compensation input image data RGB' and the main compensation input control signal CONT' include information about an image of a main compensation frame CIF.

Data corresponding to the main compensation frame CIF is generated by a Motion Estimation Motion Compensation (MEMC) scheme. In other words, the data corresponding to the main compensation frame CIF is generated by predicting a movement of an object between the first frame F1 and the second frame F2 based on images of the first frame F1 and the second frame F2 to have a median value of first frame data and second frame data.

Alternatively, the data corresponding to the main compensation frame CIF may be generated by other compensation methods.

Figure 4A:
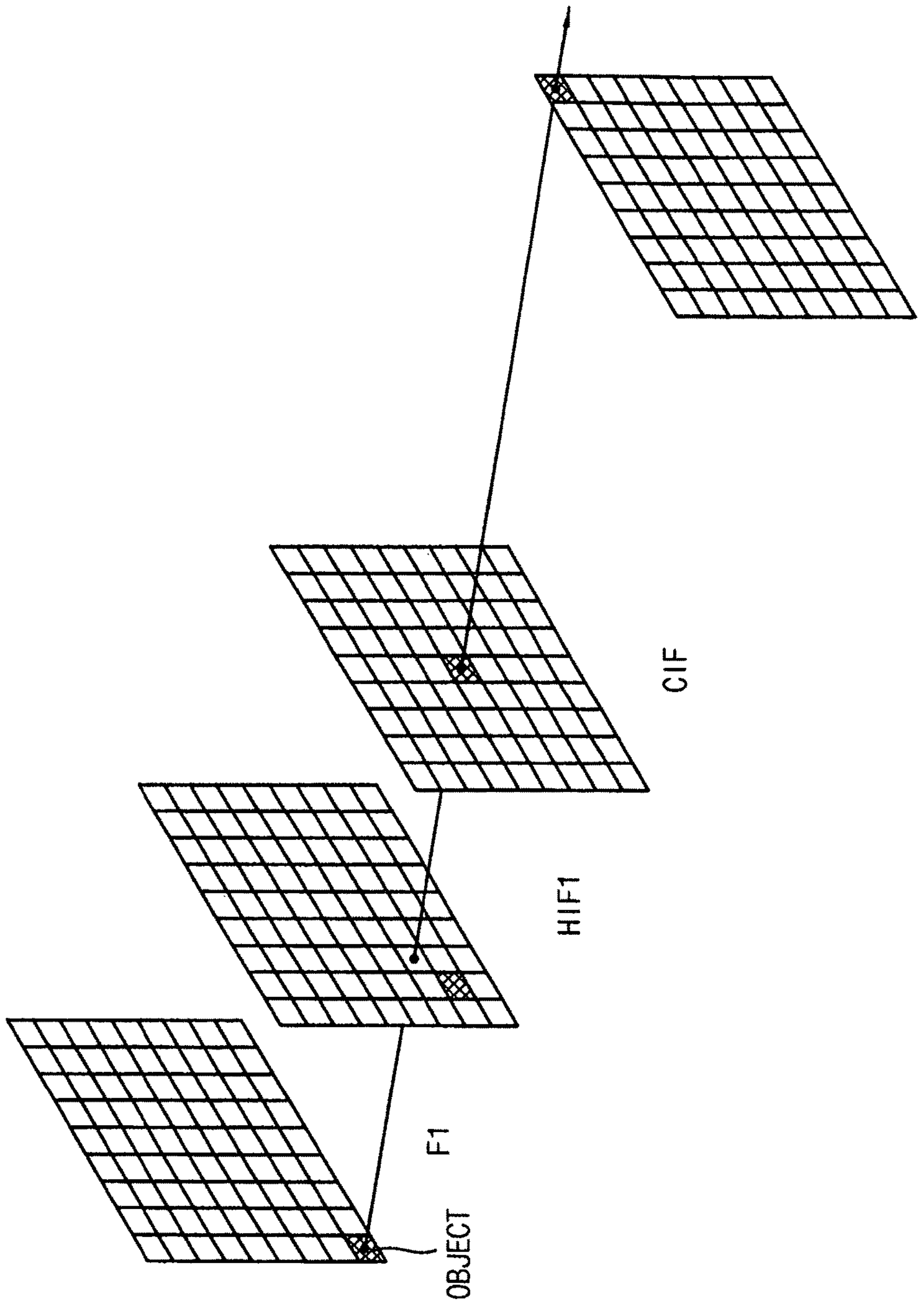
FIG. 4A is a diagram illustrating a method of generating a first compensation frame in a compensation part when a moving speed of an object is higher than or equal to a reference speed in FIG. 2.

FIG. 4A is a diagram illustrating a method of generating a first compensation frame in a compensation part when a moving speed of an object is higher than or equal to a reference speed in FIG. 2. FIG. 4B is a diagram illustrating a method of generating a second compensation frame in a compensation part when a moving speed of an object is higher than or equal to a reference speed in FIG. 2.

Figure 4B:
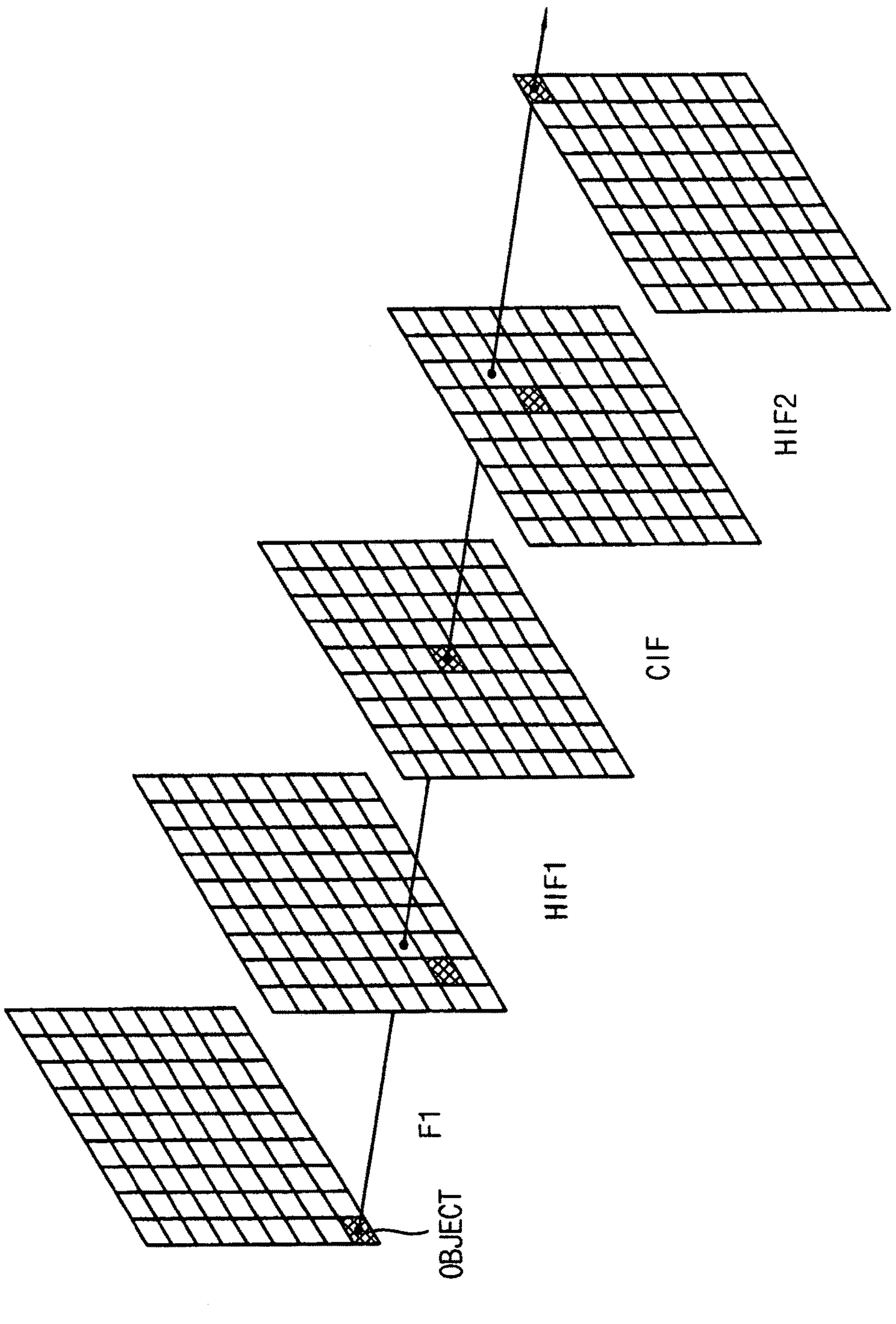
FIG. 4B is a diagram illustrating a method of generating a second compensation frame in a compensation part when a moving speed of an object is higher than or equal to a reference speed in FIG. 2.

In reference to FIGS. 2, 4A and 4B, the speed measuring part 210 measures the moving speed V of the object based on the input image data RGB and the input control signal CONT received from the external device (not shown). The moving speed V may be the speed of the object moving along the first direction D1. The speed measuring part 210 outputs the moving speed V to the speed comparing part 230.

The speed comparing part 220 compares the moving speed V received from the speed measuring part 210 with the reference speed VR. The viewer may set the reference speed VR. The speed comparing part 220 outputs the high speed signal H to the compensation part 240 when the moving speed V is higher than or equal to the reference speed VR.

A frame rate of the main compensation input image data RGB' and the main compensation input control signal CONT' is 2 n Hz. For example, the frame rate of the main compensation input image data RGB' and the main compensation input control signal CONT' may be about 120 Hz. The main compensation input image data RGB' and the main compensation input control signal CONT' include information about images of the first frame F1, the second frame F2 and the main compensation frame.

The compensation part 240 may include the second frame rate controller. The compensation part 240 may double a frame rate of received signals with the second frame rate controller.

The compensation part 240 generates the compensation input image data RGB" and the compensation input control signal CONT" based on the main compensation input image data RGB' and the main compensation input control signal CONT' when the high speed signal H is received from the speed comparing part 220. The compensation input image data RGB" and the compensation input control signal CONT" include the information about the image of the first high speed compensation frame HIF1. The compensation input image data RGB" and the compensation input control signal CONT" may include the information about the image of the second high speed compensation frame HIF2.

The first high speed compensation frame HIF1 is compensated by a different method from the main compensation frame. Data corresponding to the first high speed compensation frame HIF1 is generated based on data corresponding to the first frame F1 and the data corresponding to the main compensation frame CIF. The data corresponding to the first high speed compensation frame HIF1 may have a value closer to the data corresponding to the first frame F1 than to the main compensation frame CIF. Alternatively, the data corresponding to the first high speed compensation frame HIF1 may have a value closer to the data corresponding to the main compensation frame CIF than to the first frame F1.

The second high speed compensation frame HIF2 is compensated by a different method from the main compensation frame. Data corresponding to the second high speed compensation frame HIF2 is generated based on data corresponding to the second frame F2 and the data corresponding to the main compensation frame CIF. The data corresponding to the second high speed compensation frame HIF2 may have a value closer to the data corresponding to the main compensation frame CIF than to the second frame F2. Alternatively, the data corresponding to the second high speed compensation frame HIF2 may have a value closer to the data corresponding to the second frame F2 than to the main compensation frame CIF.

The viewer may be able to set which frame data each of the data of the first high speed compensation frame HIF1 and the data of the second high speed compensation frame HIF2 has a value closer to than the other.

Figure 5A:
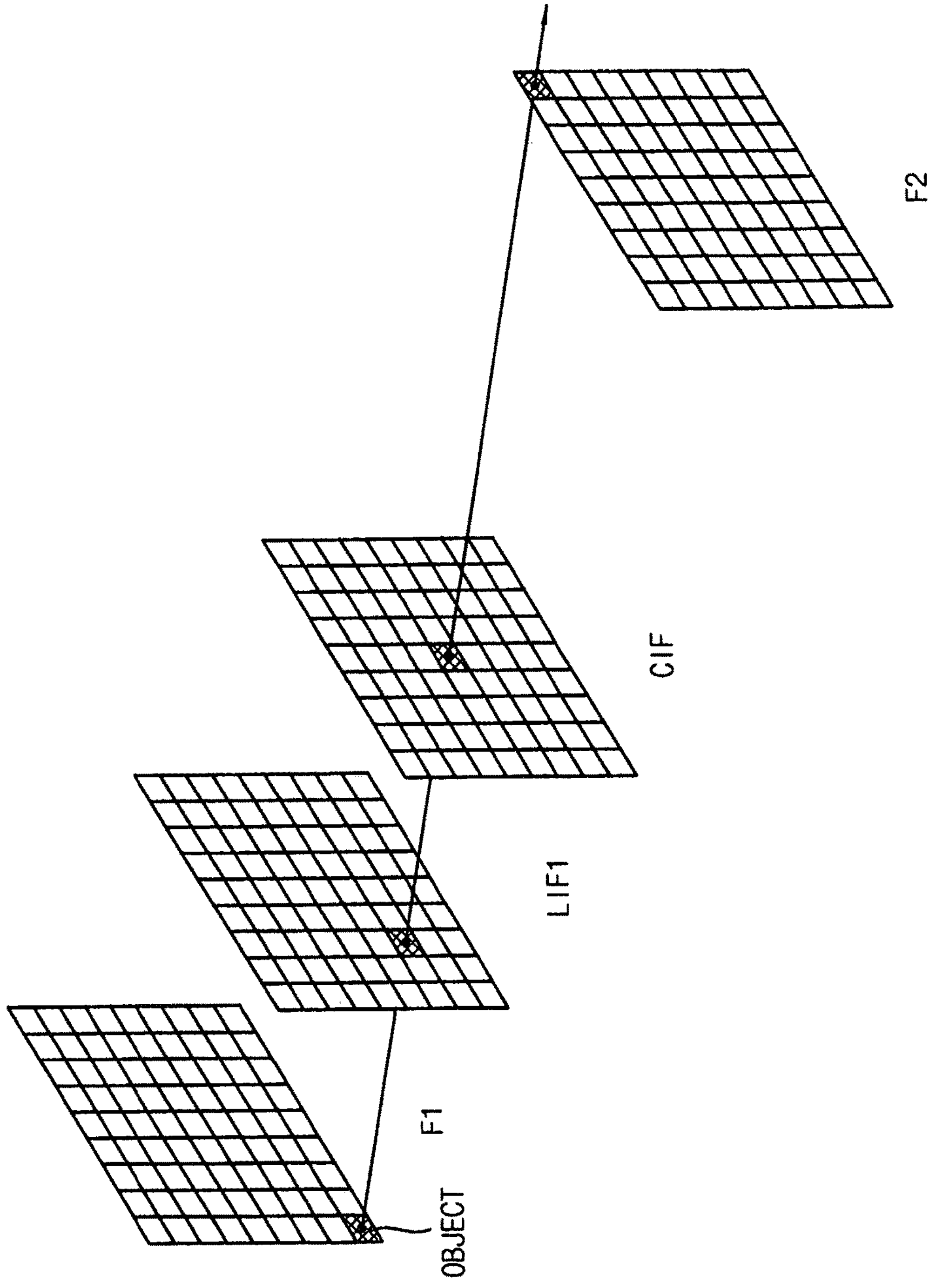
FIG. 5A is a diagram illustrating a method of generating a first compensation frame in a compensation part when a moving speed of an object is lower than a reference speed in FIG. 2.
Figure 5B:
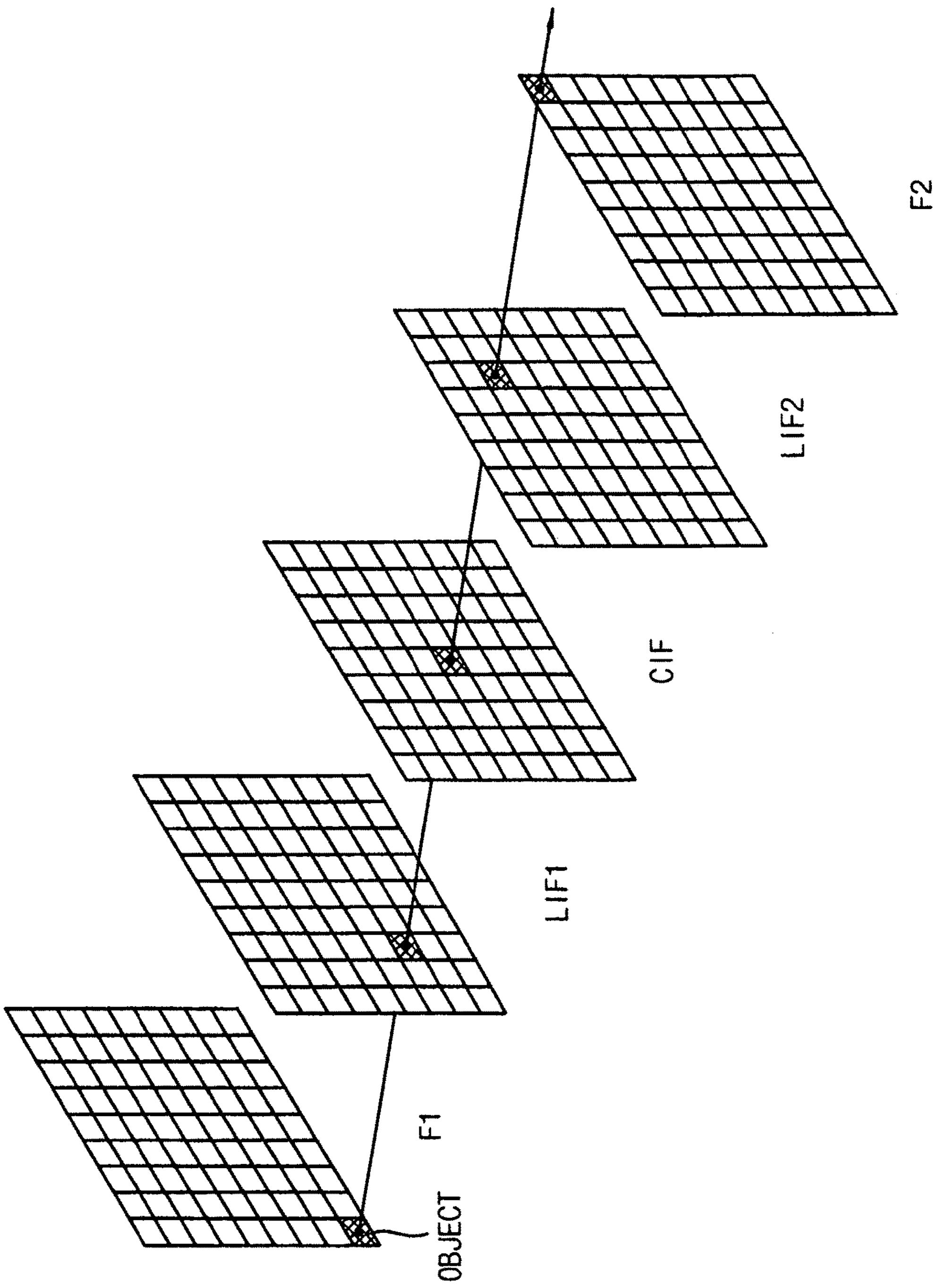
FIG. 5B is a diagram illustrating a method of generating a second compensation frame in a compensation part when a moving speed of an object is lower than a reference speed in FIG. 2.

FIG. 5A is a diagram illustrating a method of generating a first compensation frame in a compensation part when a moving speed of an object is lower than a reference speed in FIG. 2. FIG. 5B is a diagram illustrating a method of generating a second compensation frame in a compensation part when a moving speed of an object is lower than a reference speed in FIG. 2.

In reference to FIGS. 2, 3, 5A and 5B, the speed measuring part 210 measures the moving speed V of the object based on the input image data RGB and the input control signal CONT received from the external device (not shown). The moving speed V may be the speed of the object moving along the first direction D1. The speed measuring part 210 outputs the moving speed V to the speed comparing part 230.

The speed comparing part 220 compares the moving speed V received from the speed measuring part 210 with the reference speed. The viewer may set the reference speed VR. The speed comparing part 220 outputs the low speed signal L to the compensation part 240 when the moving speed V is lower than the reference speed.

A frame rate of the main compensation input image data RGB' and the main compensation input control signal CONT' is 2 n Hz. For example, the frame rate of the main compensation input image data RGB' and the main compensation input control signal CONT' may be about 120 Hz. The main compensation input image data RGB' and the main compensation input control signal CONT' include information about images of the first frame F1, the second frame F2 and the main compensation frame.

The compensation part 240 may include the second frame rate controller. The compensation part 240 may double a frame rate of received signals with the second frame rate controller.

The compensation part 240 generates the compensation input image data RGB" and the compensation input control signal CONT" based on the main compensation input image data RGB' and the main compensation input control signal CONT' when the low speed signal L is received from the speed comparing part 220. The compensation input image data RGB" and the compensation input control signal CONT" include the information about the image of the first low speed compensation frame LIF1. The compensation input image data RGB" and the compensation input control signal CONT" may include the information about the image of the second low speed compensation frame LIF2.

Data corresponding to the first low speed compensation frame LIF1 is generated by the Motion Estimation Motion Compensation (MEMC) scheme. In other words, the data corresponding to the first low speed compensation frame LIF1 is generated by predicting a movement of the object between the first frame F1 and the main compensation frame CIF based on images of the first frame F1 and the main compensation frame CIF to have a median value of first frame data and main compensation frame data.

Data corresponding to the first low speed compensation frame LIF1 is generated by the Motion Estimation Motion Compensation (MEMC) scheme. In other words, the data corresponding to the first low speed compensation frame LIF1 is generated by predicting a movement of the object between the first frame F1 and the main compensation frame CIF based on images of the first frame F1 and the main compensation frame CIF to have a median value of first frame data and main compensation frame data.

Data corresponding to the second low speed compensation frame LIF2 is generated by the Motion Estimation Motion Compensation (MEMC) scheme. In other words, the data corresponding to the second low speed compensation frame LIF2 is generated by predicting a movement of the object between the main compensation frame CIF and the second frame F2 based on images of the main compensation frame CIF and the second frame F2 to have a median value of main compensation frame data and second frame data.

Figure 6:
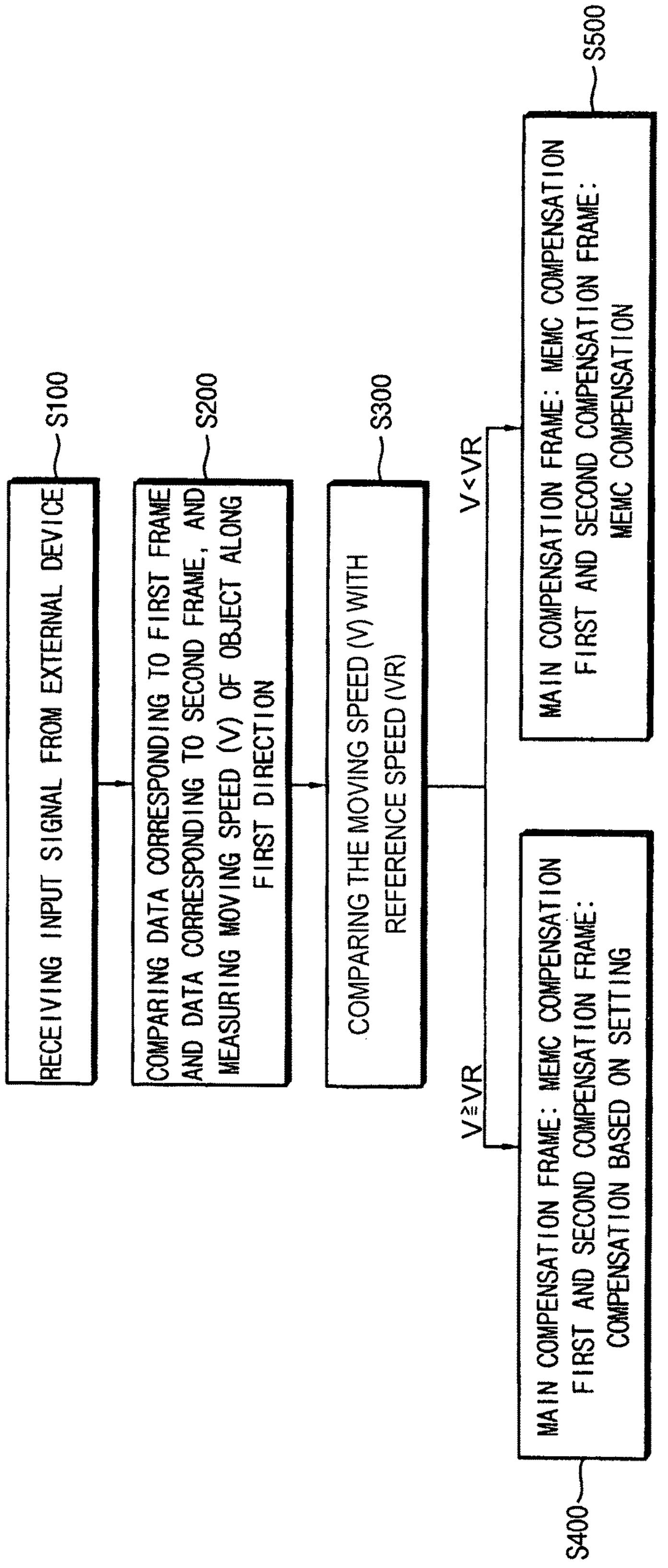
FIG. 6 is a flow chart illustrating a method of driving the timing controller according to exemplary embodiments.

FIG. 6 is a flow chart illustrating a method of driving the timing controller according to exemplary embodiments.

In reference to FIG. 6, in the method of driving the timing controller, an input signal is received from an external device. The input signal includes information about images of a first frame and a second frame (step S100). A moving speed V of an object moving along a first direction is measured based on data corresponding to the first frame and data corresponding to the second frame (step S200). The moving speed V is compared with a reference speed VR (step S300). When the moving speed V is higher than or equal to the reference speed VR, a main compensation frame is compensated by an MEMC scheme and the first and second frames are compensated by viewer's setting (step S400). When the moving speed V is lower than the reference speed VR, the main compensation frame and the first and second frames are compensated by the MEMC scheme (step S500).

Detailed explanation concerning FIG. 6 will be omitted because it will be repetitive explanation of FIGS. 1 through 5B.

According to the present inventive concept as explained above, when a speed of an object moving between each divided area of the display panel is higher than or equal to a reference speed, a method of frame compensation is changed. Therefore, the quality of display can be improved.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims.

What is claimed is:

1. A method of driving a display panel divided into a first area driven by a first driver and a second area driven by a second driver, the second area being adjacent to the first area along a first direction, the method comprising:

measuring a moving speed of an object moving along the first direction between a first frame and a second frame, the object displayed on the display panel;

comparing the moving speed with a reference speed;

adding a main compensation frame between the first frame and the second frame;

adding a first high speed compensation frame between the first frame and the main compensation frame when the moving speed is higher than or equal to the reference speed; and adding a first low speed compensation frame between the first frame and the main compensation frame when the moving speed is lower than the reference speed, the first low speed compensation frame being different from the first high speed compensation frame.

2. The method of claim 1, wherein data corresponding to the first high speed compensation frame is generated based on data corresponding to the first frame and data corresponding to the main compensation frame.

3. The method of claim 2, wherein the data corresponding to the first high speed compensation frame is closer to one of the data corresponding to the first frame and the data corresponding to the main compensation frame than to the other.

4. The method of claim 1, wherein the data corresponding to the first low speed compensation frame is generated by a Motion Estimation Motion Compensation (MEMC) scheme based on data corresponding to the first frame and data corresponding to the second frame.

5. The method of claim 1, further comprising:

adding a second high speed compensation frame between the main compensation frame and the second frame when the moving speed is higher than or equal to the reference speed; and adding a second low speed compensation frame between the main compensation frame and the second frame when the moving speed is lower than the reference speed, the second low speed compensation frame being different from the second high speed compensation frame.

6. The method of claim 5, wherein data corresponding to the second high speed compensation frame is generated based on data corresponding to the main compensation frame and data corresponding to the second frame.

7. The method of claim 6, wherein the data corresponding to the second high speed compensation frame is closer to one of the data corresponding to the main compensation frame and the data corresponding to the second frame than to the other.

8. The method of claim 1, wherein the first direction is substantially parallel with a shorter side of the display panel.

9. The method of claim 1, wherein a viewer is able to set the reference speed.

10. A timing controller comprising:

a speed measuring part configured to measure a moving speed of an object moving along a first direction between a first frame and a second frame based on an input signal;

a speed comparing part configured to compare the moving speed with a reference speed;

a main compensation part configured to add a main compensation frame between the first frame and the second frame;

a compensation part configured to add a first high speed compensation frame between the first frame and the main compensation frame when the moving speed is higher than or equal to the reference speed, and configured to add a first low speed compensation frame between the first frame and the main compensation frame when the moving speed is lower than the reference speed, the first low speed compensation frame being different from the first high speed compensation frame; and a signal generator configured to output signals for driving a display panel based on the first frame, the first high speed compensation frame, the first low speed compensation frame, the main compensation frame and the second frame.

11. The timing controller of claim 10, wherein the compensation part is configured to generate data corresponding to the first high speed compensation frame based on data corresponding to the first frame and data corresponding to the main compensation frame.

12. The timing controller of claim 11, wherein the data corresponding to the first high speed compensation frame is closer to one of the data corresponding to the first frame and the data corresponding to the main compensation frame than to the other.

13. The timing controller of claim 10, wherein the compensation part is configured to add a second high speed compensation frame between the main compensation frame and the second frame when the moving speed is higher than or equal to the reference speed, and is configured to add a second low speed compensation frame between the main compensation frame and the second frame when the moving speed is lower than the reference speed, the second low speed compensation frame being different from the second high speed compensation frame.

14. The timing controller of claim 10, wherein the first direction is substantially parallel with a shorter side of the display panel.

15. A display apparatus comprising:

a display panel divided into a first area and a second area adjacent to the first area along a first direction, the display panel configured to display an image;

a timing controller comprising:

a speed measuring part configured to measure a moving speed of an object of the image moving along the first direction between a first frame and a second frame based on an input signal;

a speed comparing part configured to compare the moving speed with a reference speed;

a main compensation part configured to add a main compensation frame between the first frame and the second frame;

a compensation part configured to add a first high speed compensation frame between the first frame and the main compensation frame when the moving speed is higher than or equal to the reference speed, and configured to add a first low speed compensation frame between the first frame and the main compensation frame when the moving speed is lower than the reference speed, the first low speed compensation frame being different from the first high speed compensation frame; and a signal generator configured to output a first upper control signal, a second upper control signal, an upper data signal, a first lower control signal, a second lower control signal and a lower data signal based on the first frame, the first high speed compensation frame, the first low speed compensation frame, the main compensation frame and the second frame;

an upper gate driver configured to output upper gate signals to the first area based on the first upper control signal;

a lower gate driver configured to output lower gate signals to the second area based on the first lower control signal;

an upper data driver configured to output upper data voltages to the first area based on the second upper control signal and the upper data signal; and a lower data driver configured to output lower data voltages to the second area based on the second lower control signal and the lower data signal.

16. The display apparatus of claim 15, wherein the compensation part is configured to generate data corresponding to the first high speed compensation frame based on data corresponding to the first frame and data corresponding to the main compensation frame.

17. The display apparatus of claim 16, wherein the data corresponding to the first high speed compensation frame is closer to one of the data corresponding to the first frame and the data corresponding to the main compensation frame than to the other.

18. The display apparatus of claim 15, wherein the compensation part is configured to generate data corresponding to the first low speed compensation frame based on data corresponding to the first frame and data corresponding to the main compensation frame.

19. The display apparatus of claim 18, wherein the data corresponding to the first low speed compensation frame has a median value of the data corresponding to the first frame and the data corresponding to the main compensation frame.

* * * * *